United States Patent
Kalous et al.

(10) Patent No.: US 9,965,910 B2
(45) Date of Patent: *May 8, 2018

(54) SAFETY LOCKOUT SYSTEMS AND METHODS

(71) Applicant: Master Lock Company LLC, Oak Creek, WI (US)

(72) Inventors: Scott Kalous, Kenosha, WI (US); Kieran MacCourt, West Yorkshire (GB)

(73) Assignee: Master Lock Company LLC, Oak Creek, WI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/357,768

(22) Filed: Nov. 21, 2016

(65) Prior Publication Data
US 2017/0140595 A1 May 18, 2017

Related U.S. Application Data

(63) Continuation of application No. 13/774,911, filed on Feb. 22, 2013, now Pat. No. 9,501,046.
(Continued)

(51) Int. Cl.
*G07C 9/00* (2006.01)
*F16P 3/14* (2006.01)
(Continued)

(52) U.S. Cl.
CPC .......... *G07C 9/00309* (2013.01); *E05B 65/48* (2013.01); *F16P 3/147* (2013.01);
(Continued)

(58) Field of Classification Search
None
See application file for complete search history.

(56) References Cited

U.S. PATENT DOCUMENTS

| 5,239,487 A | 8/1993 | Horejsi et al. |
| 5,400,138 A | 3/1995 | Peterson et al. |

(Continued)

FOREIGN PATENT DOCUMENTS

| JP | 2011-512595 | 4/2011 |
| KR | 10-1094657 | 12/2011 |

(Continued)

OTHER PUBLICATIONS

Google search: "loto display procedure steps (rfid OR barcode)" limited to before Feb. 21, 2011, performed Feb. 11, 2015, <https://www.google.com/search ?q=loto display procedu re steps (rfid OR barcode )>.

(Continued)

*Primary Examiner* — Fekadeselassie Girma
(74) *Attorney, Agent, or Firm* — Foley & Lardner LLP

(57) ABSTRACT

A lockout-tagout system for use with at least one securing item may include at least one lock for locking the securing item in place. The lockout-tagout system may further include at least one lockout tag on or near the securing item or lock. The lockout tag may have a wireless identification device. The lockout-tagout system may further include a reader configured to read the wireless identification device.

20 Claims, 8 Drawing Sheets

Related U.S. Application Data

(60) Provisional application No. 61/601,952, filed on Feb. 22, 2012.

(51) Int. Cl.
 | | |
 |---|---|
 | G05B 1/01 | (2006.01) |
 | E05B 65/48 | (2006.01) |
 | G06K 7/10 | (2006.01) |
 | G07C 1/32 | (2006.01) |

(52) U.S. Cl.
CPC ........... G05B 1/01 (2013.01); G06K 7/10297 (2013.01); G07C 9/00817 (2013.01); G07C 1/32 (2013.01); G07C 9/00896 (2013.01); G07C 2009/00769 (2013.01)

(56) References Cited

U.S. PATENT DOCUMENTS

| | | | |
|---|---|---|---|
| 5,438,312 | A | 8/1995 | Lewis |
| 6,227,019 | B1 | 5/2001 | Chhatwal |
| 6,441,735 | B1 | 8/2002 | Marko et al. |
| 6,994,258 | B2 | 2/2006 | Lewis |
| 7,092,839 | B2 | 8/2006 | Buote et al. |
| 7,110,705 | B2 | 9/2006 | Harumoto |
| 7,148,435 | B2 | 12/2006 | Lau et al. |
| 7,236,085 | B1 | 6/2007 | Aronson et al. |
| 7,254,841 | B1 | 8/2007 | Nelson et al. |
| 7,363,193 | B2 | 4/2008 | Jacobs et al. |
| 7,624,525 | B2 | 12/2009 | Frank et al. |
| 8,271,234 | B1* | 9/2012 | Cunningham ............ F41H 1/00 702/188 |
| 8,300,922 | B1 | 10/2012 | Garvey, III |
| 8,593,252 | B2 | 11/2013 | Fisher |
| 9,135,813 | B2* | 9/2015 | Stratton ................. G08C 17/02 |
| 9,501,046 | B2* | 11/2016 | Kalous ..................... G05B 1/01 |
| 2005/0128083 | A1 | 6/2005 | Puzio et al. |
| 2005/0215901 | A1 | 9/2005 | Anderson et al. |
| 2006/0151306 | A1 | 7/2006 | Lau et al. |
| 2007/0200673 | A1* | 8/2007 | Godwin ............ G07C 9/00896 340/5.73 |
| 2007/0200763 | A1 | 8/2007 | Allen et al. |
| 2007/0290789 | A1 | 12/2007 | Segev et al. |
| 2008/0154691 | A1* | 6/2008 | Wellman ............. G05D 1/0282 705/7.26 |
| 2009/0040014 | A1* | 2/2009 | Knopf ..................... E04G 21/32 340/5.1 |
| 2009/0090148 | A1 | 4/2009 | Kollin et al. |
| 2009/0243812 | A1* | 10/2009 | Yamamoto ........ G06F 17/30569 340/10.41 |
| 2010/0156650 | A1* | 6/2010 | Stern ........................ H04Q 9/00 340/657 |
| 2010/0188187 | A1* | 7/2010 | Mughal .................. H01H 85/24 337/225 |
| 2010/0269553 | A1 | 10/2010 | Zhong |
| 2010/0326146 | A1 | 12/2010 | Powers et al. |
| 2012/0235515 | A1* | 9/2012 | Scharnick ................ H02J 4/00 307/328 |
| 2013/0214922 | A1* | 8/2013 | Clarke ................ G01R 19/155 340/514 |
| 2014/0027507 | A1* | 1/2014 | Jonely ................ G07C 9/00658 235/382 |
| 2017/0140596 | A1* | 5/2017 | Retzlaff ............. G07C 9/00896 |

FOREIGN PATENT DOCUMENTS

| | | |
|---|---|---|
| WO | WO-2005/118987 | 12/2005 |
| WO | WO-2008/037645 | 4/2008 |
| WO | WO-2012/064822 | 5/2012 |

OTHER PUBLICATIONS

International Search Report and Written Opinion for International Application No. PCT/US2011/059935, dated Feb. 29, 2012.
International Search Report and Written Opinion for International Application No. PCT/US2013/027400, dated Jun. 26, 2013, 10 pages.
OSHA—29 CFR 1910.147, published on or before Jan. 31, 2011, accessed Feb. 12, 2015, <https ://web.arch ive.org/web/20110131060314/http ://www.osha.gov/pls/oshaweb/owadisp.show _ document?p id=9804&p table=STANDARDS>.
Redbusbar, "Lockout Tagout Software", published on or before Nov. 27, 2011, accessed Feb. 11, 2015, <https://web.archive.org/web/20111127191535/http://www.redbusbar.com/shop/Lockout-Tagout-Software/>.

* cited by examiner

SAFETY LOCKOUT SYSTEMS AND METHODS

CROSS-REFERENCE TO RELATED APPLICATIONS

This application is a continuation of U.S. patent application Ser. No. 13/774,911, filed Feb. 22, 2013, which claims the benefit of and priority to U.S. patent application Ser. No. 61/601,952, filed Feb. 22, 2012, both of which are incorporated herein by reference in their entireties.

BACKGROUND

The present disclosure generally relates to the field of lockout-tagout (LOTO) systems. The present disclosure relates more specifically to the use of wireless technology in lockout-tagout systems.

In some applications, certain areas or equipment call for multiple steps to occur prior to granting access or restricting access from the areas or equipments. These multiple steps are often intended to help ensure that a safety process is properly completed. Tagout-lockout systems are used to support such processes.

Once a potentially dangerous piece of equipment is turned off, for example, the switch for the equipment may be locked out (e.g., using a hasp having multiple apertures) using multiple padlocks. Each padlock typically prevents movement of the hasp and each padlock typically represents a step of a safety procedure. Tags are typically placed on the equipment to, e.g., warn users that the equipment is not to be used. When a safety procedure is completed, an associated padlock can be removed by the appropriate personnel. A policy is often established such that only the user that placed a lockout tag and padlock can remove the lockout tag and padlock. Tags and padlocks are typically associated with different colors so that steps or personnel responsible for the tags and locks may be identified. Lockout-tagout systems are conventionally communicated, tracked, and monitored using manual processes.

SUMMARY

One embodiment of the present disclosure relates to a lockout-tagout system for use with at least one securing item. The lockout-tagout system includes at least one lock for locking the securing item in place and at least one lockout tag on or near the securing item or lock. The lockout tag has a wireless identification device. The lockout-tagout system includes a reader configured to read the wireless identification device.

Another embodiment of the present disclosure relates to a lockout-tagout system. The lockout-tagout system includes a location tag having a first wireless identification device. The lockout-tagout system further includes at least one securing item having a second wireless identification device. The lockout-tagout system further includes at least one lock for locking the securing item in place, the lock having a third wireless identification device. The lockout-tagout system further includes at least one lockout tag having a fourth wireless identification device. The lockout-tagout system further includes a reader configured to read the first, second, third, and fourth wireless identification devices of the location tag, the at least one securing item, the at least one lock, and the at least one lockout tag.

Yet another embodiment of the present disclosure relates to a lockout station system for use with a plurality of lockout-tagout devices. The lockout station system includes a lockout station housing, a first wireless identification device associated with the lockout station housing, a lockout-tagout procedure listing associated with the lockout station housing and having a second wireless identification device, and a reader configured to read the second wireless identification device. The reader is configured to instruct the user to check out certain of the lockout-tagout devices based on information read from the second wireless identification device. The reader is configured to check out at least one of the plurality of lockout-tagout devices using wireless communications and according to the instructions. The reader is configured to write the check out information to at least one of the first wireless identification device and the second wireless identification device.

Yet another embodiment of the present disclosure relates to a portable electronic device for reading lockout-tagout devices. The portable electronic device includes a transceiver configured to use wireless communications to read the lockout-tagout devices, a display, and a processing circuit coupled to the transceiver and the display. The processing circuit is configured to recall a lockout-tagout procedure from memory and to cause instruction steps to be shown on the display, wherein the instruction steps include reading the lockout-tagout devices during the lockout-tagout procedure and checking the read lockout-tagout devices relative to the lockout-tagout procedure.

Yet another embodiment of the present disclosure relates to a location sign for use in a lockout-tagout system. The location sign includes a wireless communications device and memory storing a unique identifier for the location sign and an identifier of a lockout-tagout procedure for use with the location sign.

Yet another embodiment of the present disclosure relates to a lock. The lock includes a wireless receiver for receiving user identification information. The lock further includes a processing circuit coupled to the wireless transceiver and having a memory, wherein the processing circuit checks user identification information received at the wireless transceiver relative to a lockout-tagout procedure, and wherein the processing circuit prevents the lock from disengaging unless the lockout-tagout procedure has been completed by authenticated users.

Another embodiment relates to a computerized method. The computerized method includes receiving information regarding the appropriate lockout-tagout procedure for a given location or device. The method further includes recalling a lockout-tagout procedure in response to the received information. The method also includes presenting feedback to the user regarding the lockout-tagout procedure and lockout-tagout devices to be read. The method further includes reading identifying information for lockout-tagout devices placed or removed as a part of the lockout-tagout procedure. The method also includes causing the lockout-tagout devices to be associated with the location or device in a memory, the association according to the recalled lockout-tagout procedure, when the read lockout-tagout devices are determined to comply with the recalled lockout-tagout procedure.

In some embodiments, the reading is completed via optical recognition. In other embodiments the reading is completed via RFID. In yet other embodiments, a combination of RFID and optical recognition may be used. Further, the information regarding the appropriate lockout-tagout procedure for a given location or device may be received via a user input device. In some embodiments, the information regarding the appropriate lockout-tagout procedure for a given location or device is received in response to reading a location tag via optical or RFID recognition and providing information from the location tag read to a module for determining the lockout-tagout procedure corresponding with the location tag. In an exemplary embodiment, the lockout-tagout devices do not automatically determine or communicate their state as a part of the method. The method may include processing the associations in memory to cause user feedback to be output in response to a lockout-tagout procedure which has not been completed or completed properly.

Another embodiment of the invention relates to a non-transitory machine-readable medium encoded with instructions (e.g., computer code instruction), that when executed by a processor, cause the processor to carry out a process. The steps of the process may include receiving information regarding the appropriate lockout-tagout procedure for a given location or device. The steps of the process may further include recalling a lockout-tagout procedure in response to the received information. The steps of the process may further include presenting feedback to the user regarding the lockout-tagout procedure and lockout-tagout devices to be read. The steps of the process may also include reading identifying information for lockout-tagout devices placed or removed as a part of the lockout-tagout procedure. The steps of the process can also include causing the lockout-tagout devices to be associated with the location or device in a memory, the association according to the recalled lockout-tagout procedure, when the read lockout-tagout devices are determined to comply with the recalled lockout-tagout procedure.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for using wireless communication to support lockout-tagout systems and procedures are shown and described. Wireless communication such as radio frequency identification (RFID) may be used to identify the status of a lockout-tagout safety device (e.g., a padlock, a hasp, a lock to which the hasp couples to the device itself, etc.), track a status of the safety device, check compliance with the lockout-tagout procedure, or to communicate or track other information.

Systems and Methods for Using Wireless Communication to Support Mechanical Locks of a Lockout-Tagout System Referring generally to FIGS. 1A-5B, lockout-tagout (hereinafter LOTO) systems and related methods for use with mechanical locks are shown and described. Embodiments of FIGS. 1A-5B advantageously allow users to conduct LOTO procedures with mechanical locks and with the support of wireless communications (e.g., RFID communication).

Figure 1A:
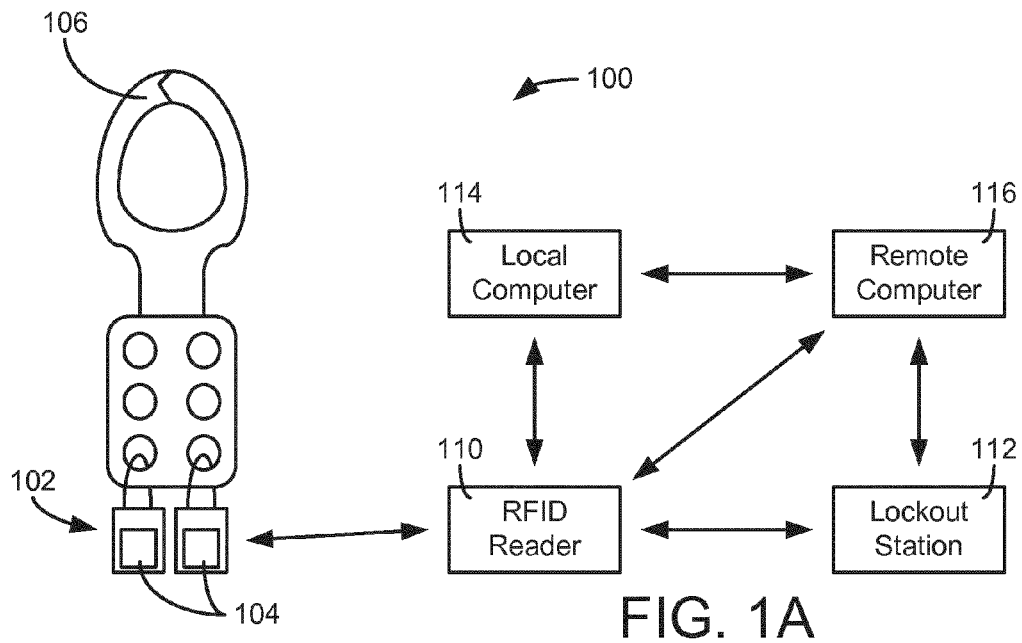
FIG. 1A is a block diagram of a lockout-tagout (LOTO) system, according to an exemplary embodiment.

Referring now to FIG. 1A, a block diagram of a LOTO system 100 is shown, according to an exemplary embodiment. LOTO system 100 includes a lockout device 106. Lockout device 106 is shown in FIG. 1A as a hasp 106, but could be another mechanism (e.g., a valve cover, circuit lockout, etc.) depending on the application. Lockout device 106 may lock a piece of equipment in place or restrict movement of a switch, lever, or other mechanism associated with a piece of equipment. An exemplary hasp installed in a locked position on equipment (e.g., a valve) is shown in greater detail in FIG. 1B.

Figure 1B:
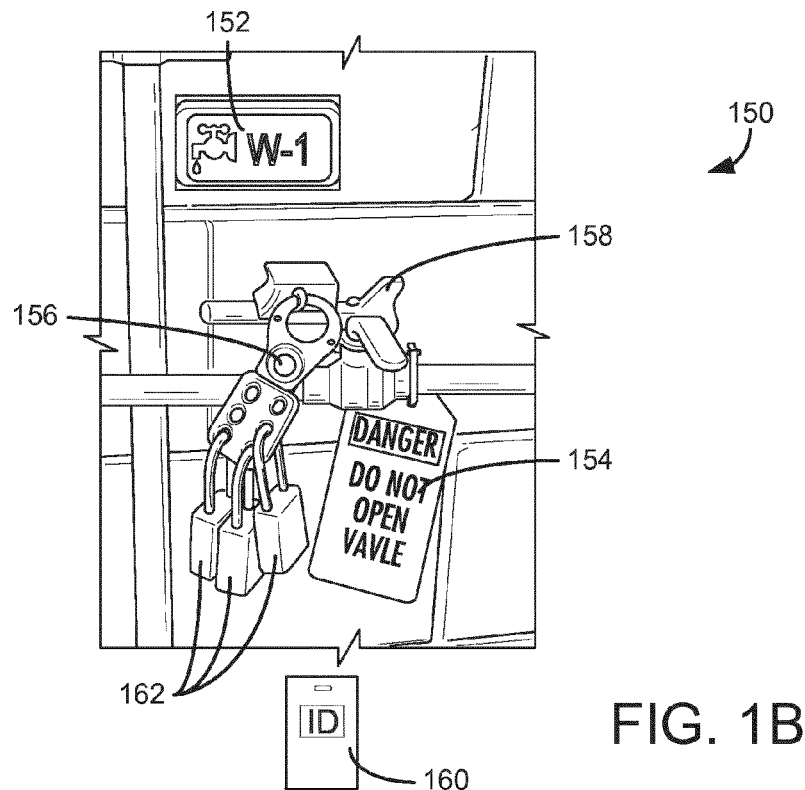
FIG. 1B is an example environment in which the LOTO system of the present disclosure may be implemented, according to an exemplary embodiment.

Hasp 106 is configured to be secured in the closed position (i.e., locked) by one or more padlocks 102 as shown in FIGS. 1A-B. The embodiment of FIG. 1A shows two user padlocks 102 securing the movement of hasp 106, preventing hasp 106 from opening. The number of padlocks used in the tagging and locking system may vary. Typically the number of padlocks depends on the number of steps or number of personnel involved with making the equipment safe for opening (e.g., as defined by a pre-established lockout-tagout process). Each user padlock 102 is shown to include an RFID tag 104. RFID tag 104 can store information and wirelessly transfer the information to an RFID reader 110 (e.g., in response to an activating or probing signal from the reader). For example, each RFID tag 104 may store an identifier that can be used to associate padlock 102 with the established LOTO process and/or information thereof (e.g., a person responsible for padlock 102, a key or set of keys associated with the lock, a hasp associated with the location, an inspector ID associated with the process, a timestamp, an identifier of the person placing the padlock 102, etc.).

RFID tag 104 may be in the form of a sticker, a plastic chip, embedded within a structure (e.g., the plastic) of padlock 102, or coupled to padlock 102 via another mechanism. RFID reader 110 can read RFID tags 104 of the user padlocks 102 and other RFID compatible devices. RFID reader 110 may be a standalone handheld RFID reader, an RFID reader integrated into another device such as smart phone, a laptop, an RFID device capable of reading and writing information to the RFID tags, a powered card with RFID reading capability, a keyfob with RFID technology, or otherwise. RFID reader 110 is described in greater detail in subsequent Figures.

LOTO system 100 is shown including a lockout station 112, a local computer 114, and a remote computer 116 in communication with one another. Local computer 114 may receive data from RFID reader 100 via a wired (e.g., a universal serial bus (USB)) or wireless (WiFi) connection. Local computer 114 may be a personal computer (PC), laptop, tablet, server or other electronic device configured to receive a wired or wireless signal from RFID reader 110. A block diagram of an exemplary local computer is shown in greater detail in FIG. 5B.

Local computer 114 may use the data to verify or change the status of the locking mechanism, locks, or location. Local computer 114 can also transmit the data to a remote computer 116 via a wired or wireless connection. Remote computer 116 may conduct further processing on the received information. Local computer 114 and/or remote computer 116 may include LOTO management software for managing a plurality of LOTO locations. A block diagram of an example remote computer is shown in greater detail in FIG. 5B.

LOTO system 100 may further include lockout station 112. The Lockout station 112 may be a station that includes equipment for the tagging and locking system, such as locks, hasps or other locking mechanisms, etc. Lockout station 112 may further act as a wired or wireless hub, and/or may have an RFID reader/writer built within. Lockout station 112 may allow a user to "check out" a lock or locking mechanism. For example, if a user wishes to apply a lock to a piece of equipment, he/she may check out the lock at lockout station 112 using a RFID reader. Lockout station 112 may then record the lock as checked out to the user, and/or transmit the lock information to a remote computer 116. An example lockout station is shown in greater detail in FIG. 4B.

While lockout station 112 is shown in FIG. 1A and in other figures of this application, in some embodiments a lockout station 112 is not a part of the system. In such embodiments, for example, a tablet computer or other mobile computing device can provide process steps described herein as being associated with the lockout station. For example, the tablet may be used to associate hasps, locks, or other safety or identifying resources with a particular location and that location's LOTO process. The tablet may cause the association to be completed in local memory and/or in memory of a remote computer. The tablet/portable computing device can also cause the read information (e.g., from RFID or barcoded LOTO equipment) to be checked for compliance with a fetched LOTO process.

FIG. 1A illustrates hasp 106 applied to equipment and multiple padlocks 104 applied to hasp 106. In other embodiments or situations, the multiple padlocks may be applied directly to the equipment (e.g., no hasp is used). In yet other embodiments or situations, a single padlock may be applied directly to the equipment. Unless specifically limited in the claims, systems and methods of the present disclosure may be applied regardless of the number of padlocks or hasps used in the LOTO system. For example, zero, one, or more than one hasp may be used in the LOTO system, and/or one or more than one padlock may be used in the LOTO system.

While local computer 114 and RFID reader 110 are shown as separate blocks in FIG. 1A, the two components are integrated according to some exemplary embodiments. For example, in some embodiments the local computer 114 and RFID reader 110 are a PDA, mobile phone, tablet computer, or other portable electronic device having integrated RFID reading capabilities or a plug-in RFID reader. Moreover, such a portable electronic device may also or alternatively include optical recognition hardware (e.g., a 1-D or 2-D barcode or QR code recognition feature) configured to read identifiers described herein. In an exemplary embodiment, RFID reading and optical reading can both be used to record the devices of a LOTO procedure and to check compliance with a LOTO process.

Referring now to FIG. 1B, an example environment 150 in which the tagging and locking system of the present disclosure is implemented is shown. Environment 150 includes a location tag 152 readable by an RFID reader/writer. Location tag 152 identifies the location of the equipment. Location tag 152 may identify a location in a building area or one or more specific pieces of equipment, signs, or other objects in a building area. For example, location tag 152 may identify a specific valve, control, panel, or switch subject to an LOTO procedure. Location tag 152 may also or alternatively identify a particular LOTO procedure, a building area, or simply have a unique identifier for reading by the reader. Location tag 152 may be read by an RFID reader or optical reader first so that subsequent reads (e.g., of items 154, 156, 158) are recorded as relating to the same location. In some embodiments a portable reader (e.g., mobile PDA, tablet computer) can use an optical sensor (e.g., camera) to visually identify the location identifier without the use of radio frequency communication. In other embodiments the portable reader is configured to use either or both types of technology (optical or RF) to read the location tag 152.

The location tag data stored by location tag 152 may include the name or description of the location. The location tag data may also include the energy type associated with the location or the equipment of the location (e.g., electrical, mechanical, hydraulic, pneumatic, steam, gas, fluids, etc.). The location tag data may include a list of correct or necessary equipment (e.g., number and class of locks) that should be used in the LOTO procedure at the location. The location tag data may include a list of users associated with the LOTO procedure at the location. The list of users may be a list of specific users, a list of all users in a desired category (e.g., all administrators, all users with a given security clearance, etc.), or a combination of specific and more general user identifications. In some embodiments the location tag data is not stored on the location tag itself, but is recalled or fetched from a local or remote database by the reading device (e.g., PDA, mobile phone, tablet, etc.).

The location tag data may include a LOTO procedure or sequence for the location. As noted above, the location tag data may include data that causes the reader to automatically lookup (e.g., from local or remote memory) the correct LOTO procedure for the location. The LOTO procedure or sequence may include a list of the necessary locking devices (e.g., or approved classes or types of devices), the locking or unlocking steps needed to be conducted to comply with the process, and/or the order in which the equipment should be locked or unlocked. Using the LOTO procedure stored by location tag 152, it may be determined whether the subsequent reads of the devices in the area are conducted in the proper order (e.g., if the users locking out the location are doing so in the correct or proper order).

An RFID reader/writer 160 or other electronic device may be configured to write data to location tag 152 (e.g., after the user is prompted to hold RFID reader/writer 160 to location tag 152). The data may include a lockout time or date, and the user or device that changed the state (e.g., locked/unlocked) of the read lock. For example, when a user locks a lock, he/she may then be instructed to use RFID reader 160 to write an identifier for the lock to location tag 152. The data written to location tag 152 may further include the identification of items 154, 156, 158, or a list of the other locks 162 that are already in place.

RFID reader 160 may maintain a log of previous users and access to the equipment (e.g., previous times the padlocks or equipment were locked/unlocked). The log may include data related to a time/date of access, a device and/or user accessing the equipment, and a work order number or other identifier related to the accessing of the equipment (e.g., if the user accesses the equipment as part of a scheduled maintenance).

In FIG. 1B, three user padlocks 162 are shown securing multiple securing items 156, 158 (e.g., a hasp 156 and a clamp 158 restricting movement of the valve). User padlocks 162 include lock tags that are readable by RFID reader 160. The data on the lock tags may include a unique identifier, a serial number, a product type, a part number, or other information that describes padlocks 162. The data on the lock tags may further include user data (identifying a user lock as belonging to a particular user). The data on the lock tags may further include approved locations or uses for the user locks (e.g., if the lock should be used for a particular piece of equipment or in a particular building area).

A RFID reader/writer 160 or other electronic device may be configured to write data to the RFID tags on user locks 162. This data may be written to the RFID tags automatically when read, or may be written to the RFID tags when prompted to by RFID reader/writer 160. The data written may include a lockout time or date, and the user or device that locked lock 162.

Secured items 156, 158 may also include RFID tags. The data on the equipment or device tags may relate to a serial number, product type, part number, or other type of identifier that uniquely identifies securing items 156, 158. The data may be read by RFID reader 160. Further, lockout tag 154 may include a RFID tag readable by RFID reader 160. Lockout tag 154 may be placed in environment 150 by a user and may include information related to the operation of the equipment and/or the LOTO system in place.

In alternative embodiments, some or all of the LOTO devices in a LOTO system or LOTO process may be read via optical recognition (e.g., have barcodes, 2-D optical codes, QR codes, etc.).

Figure 2:
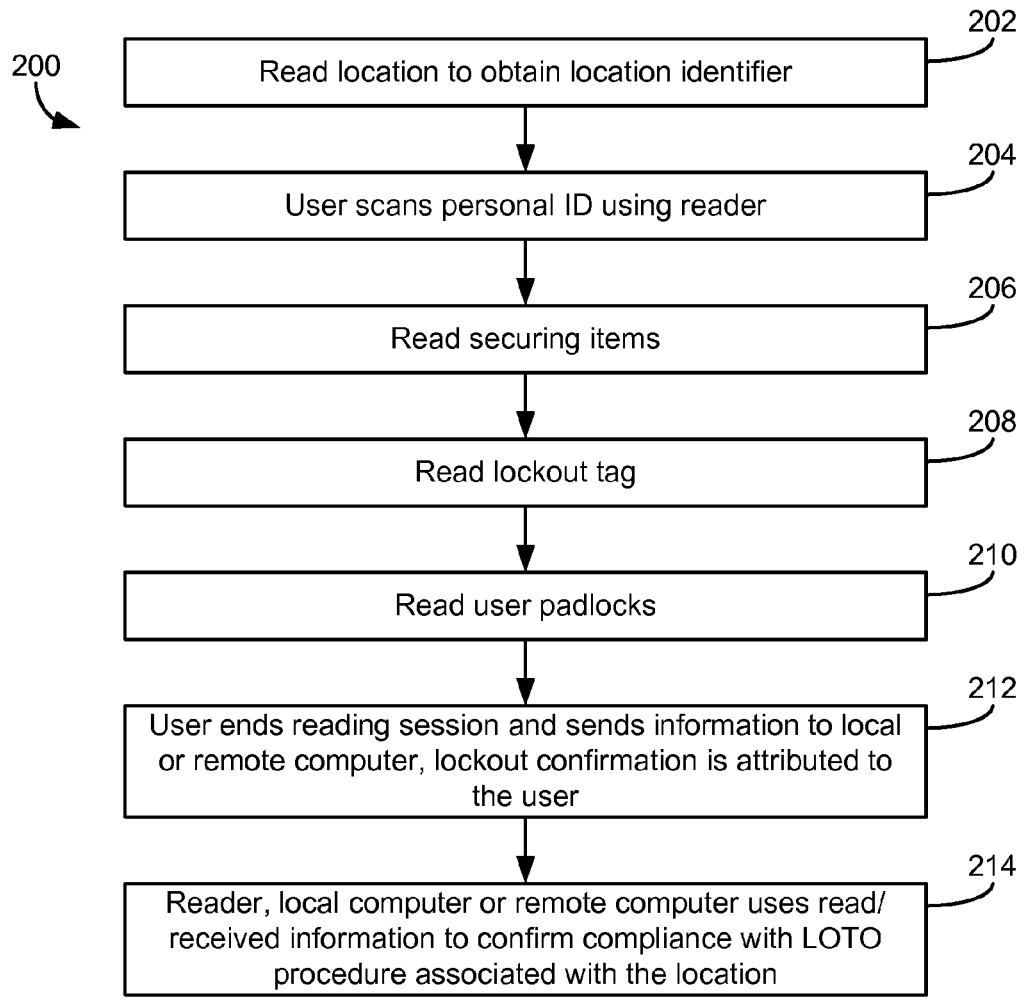
FIG. 2 is a flow chart of a lockout sequence process, according to an exemplary embodiment.

Referring now to FIG. 2, a flow chart of a process 200 of a lockout sequence is shown, according to an exemplary embodiment. Process 200 may be used on, for example, the devices and environment 150 of FIG. 1B. Process 200 includes reading a location tag to obtain a location identifier (step 202). The user may then scan a personal ID (e.g., RFID reader/writer 160) to cause the lockout sequence to be attributed to the user (step 204). The user may then read one or more securing items using the reader to indicate that the securing items are in place at the location (step 206). A lockout tag may also be read by the reader to indicate that the tag is in place at the location (step 208). User padlocks may be read by the reader to indicate that the padlocks are in place at the location (step 210). Steps 206-210 may include using the reader to read the RFID tags of the securing items, the lockout tag, and the user padlocks. When the user ends the reading session (e.g., when the user is finished scanning RFID tags with the reader), the reader may send the read information to a local or remote computer, and lockout confirmation of the location, assuming all proper items, tags, and padlocks are in place, may be attributed to the user (step 212). The transmission from the reader may occur in response to a user command, automatically after a period of time, or automatically based on another trigger (e.g., the reader has read all of the locks and tags necessary for a valid lockout of the location within a period of time).

Process 200 further includes the reader, a local computer, or a remote computer using the read or received information to confirm compliance with a LOTO procedure associated with the location (step 214). In some embodiments, the reader may be configured to call or look for reads to be conducted in a certain lockout order associated with the LOTO process for the location (e.g., following steps 206, 208, 210 in order). In other embodiments, the reader may gather information and another device (e.g., the local or remote computer) may check to confirm that all items, tags, and padlocks are in place. The reader may associate a timestamp with each read of a RFID tag. The timestamps may be processed by the reader, the local computer, or the remote computer to check the LOTO reads against an LOTO procedure ordering.

In some embodiments, confirming compliance with the LOTO procedure associated with the location can include providing feedback (e.g., graphical user interface instructions, confirmations, requests, etc.) to the user, a supervisor, or another entity based on the information received from the reader (e.g., a read location identifier or a read LOTO procedure identifier). For example, the local computer may cause an GUI or electronic message to be generated or to print a report that indicates an improper LOTO procedure was used at a location. Such reports may be used for training purposes or can trigger a follow-up check to be conducted before further work at the location is completed. In other embodiments, logic of the reader or of the local or remote computers can cause immediate feedback (e.g., text message feedback, graphical user interface feedback, etc.) to be sent back to the reader or to a portable electronic device (e.g., mobile phone via text, via voice mail, via e-mail) associated with the user. For example, the feedback may be text that may state "Confirmation of lockout at location W-1 failed. A padlock associated with a gas line inspection has not been read. Please take appropriate steps and re-read the location." Another example would be a request and response type graphical user interface: "The next step in the LOTO process for this location is for a level T3 employee to confirm that the gas pressure is within specification and to place lock type B into the hasp." When a T3 level employee causes a read of lock type B at the location by his or her portable electronic device, the portable electronic device or a remote server may check for compliance and send immediate feedback. In this example, the reply might be "Step verified, please take a picture of the current state and proceed to the next step." In an example where the incorrect lock type is placed, the portable electronic device might display a message such as "Incorrect lock placed, please review the above procedure and retry your device read." Such messages may be accompanied by graphics (e.g., icons or other non-text indicators), video instruction, or other graphical user interface feedback.

Figure 3:
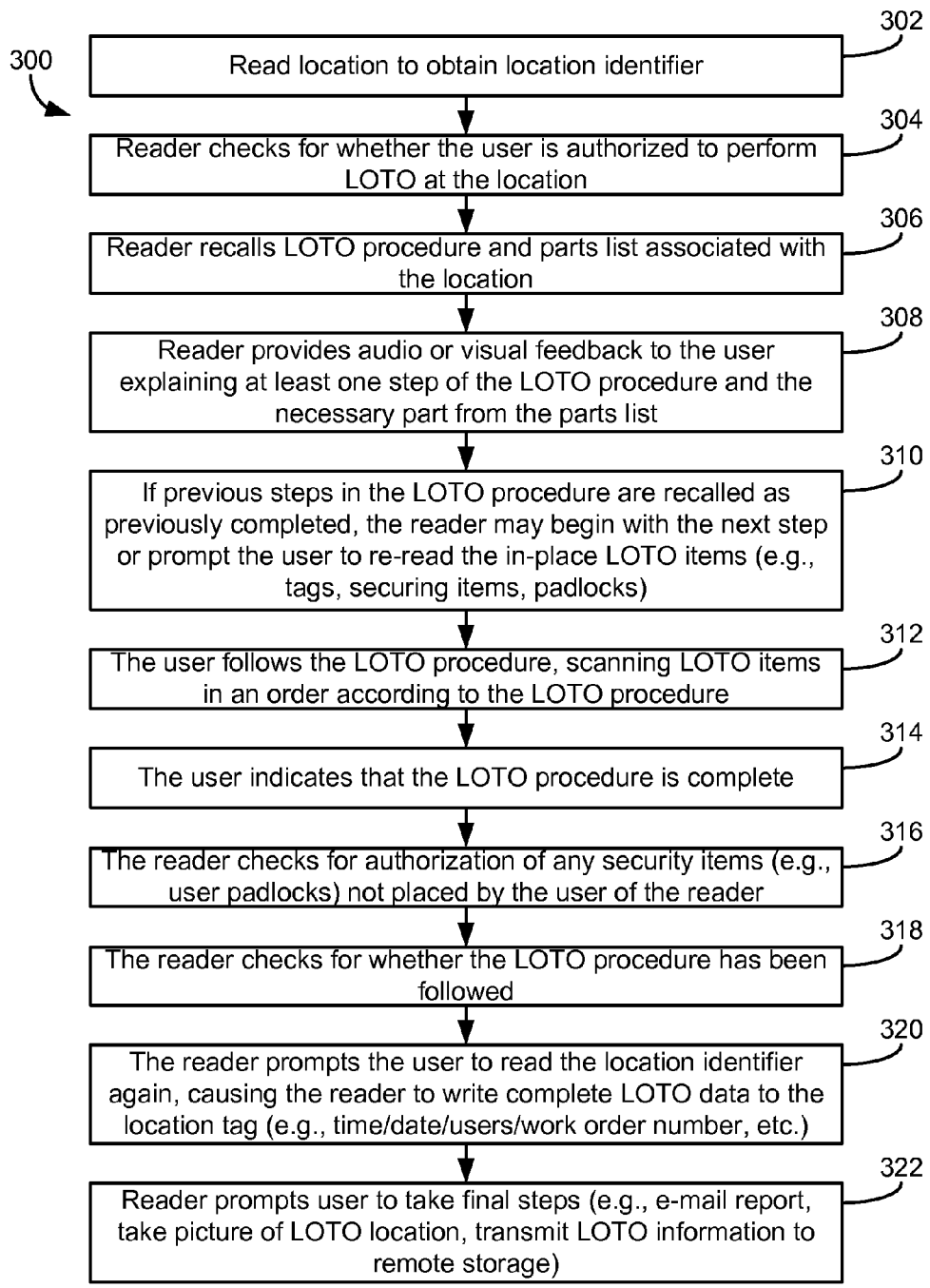
FIG. 3 is a flow chart of another lockout sequence process, according to an exemplary embodiment.

Referring now to FIG. 3, another flow chart of a process 300 of a lockout sequence is shown, according to an exemplary embodiment. Process 300 may be implemented using a handheld reader/writer device, smartphone, or another mobile device having the ability to provide audio and/or visual feedback to the user. Process 300 is shown to include reading a location to obtain a location identifier (step 302). When the location identifier is obtained by the reader, the reader may fetch information regarding the LOTO process associated with the location. The reader may use information about the location and/or process to check for whether the user is authorized to perform LOTO at the location (step 304). If the user is not authorized to perform LOTO at the location, the reader may prompt the user for an override code, send an alert to an administrator, or take other corrective action.

If the user is authorized to perform LOTO at the location, process 300 may continue and the reader may recall details of a proper LOTO procedure and parts list associated with the location (step 306). The LOTO procedure and parts list may be retrieved from local memory or may be requested from a remote computer using, e.g., the location identifier obtained in the first step and the authorization ID of the user.

Using the recalled LOTO procedure and parts list associated with the location, the reader may provide audio or visual feedback to the user explaining at least one step of the LOTO procedure and a necessary part from the parts list (step 308). For example, if the lockout procedure relates to turning a gas valve off, the LOTO procedure may require that the user place an 'OFF-Do Not Turn On' tag on downstream equipment and confirm that the equipment is off by inserting the user's padlock into the appropriate securing item at the valve location. Once the user has placed the lockout tag on the downstream equipment, the user may be prompted to read the tag with the reader. Once the reader recognizes a read of a valid lockout tag, the reader may prompt the user to lock the user's padlock in the hasp and to scan the padlock once locked. The reader may be configured to use the LOTO procedure to provide real-time (or near real-time) feedback (e.g., graphical user interface feedback, text message feedback, etc.) to the user after scans. The reader can, for example, tell the user when a step has been conducted out of order, is improper, is proper, or when the step has been confirmed. When a step is valid, the reader can prompt the user to complete the next step. If a step is valid, the reader (or a remote computing device in communication with the reader) can cause the lockout-tagout devices to be associated with the LOTO location (and/or its LOTO process or equipment) in local or remote memory (e.g., a LOTO database for the process or equipment). The association can be made in a way that is in compliance with the recalled lockout-tagout procedure (one procedure may require a timestamp, a witness verification, etc. while another procedure may require the identification of the tag and the employee placing the tag, etc.). In some embodiments, the association will not be made unless the process is being followed properly. In other embodiments, the association is made even if it does not comply (such non-compliance may be electronically/automatically recognized and reported at a later time).

If previous steps in the LOTO procedure are recalled as previously completed, the reader may begin (e.g., providing feedback) with the next step in the LOTO procedure, or may prompt a user to re-read the in-place LOTO items (step 310). For example, if a new user is coming to the LOTO location with the LOTO procedure already in process, then the reader may begin with the next step for completion upon scanning the location identifier and recalling information regarding the LOTO procedure. In some embodiments, or based upon a preference setting, the reader may prompt the new user to re-read the in-place LOTO items (e.g., tags, securing items, padlocks) to confirm that the reader's records regarding the status of the LOTO procedure are correct.

Once the user has followed the LOTO procedure and has scanned the LOTO items in an order according to the LOTO procedure (step 312), the user may indicate that the LOTO procedure is complete (step 314). Indicating that the LOTO procedure is complete may include pressing a button on the reader or conducing a step that means the LOTO procedure is complete (e.g., scanning a final item).

As a part of the completion step, the reader may check for authorization of any security items (e.g., user padlocks) not placed by the user of the reader (step 316). If, for example, the user's scanning of all of the LOTO items at the location indicates a padlock that had not previously been scanned, the reader can check for whether the user was authorized to place the padlock or whether a record exists of another authorized user placing the padlock. If an unauthorized placement has occurred, the reader can generate an appropriate alert and/or walk the user through steps for authorizing the previously unauthorized placement (e.g., audio output, via graphical user interface output, etc.).

The reader may conduct other checks for whether the LOTO procedure has been followed (step 318). If the LOTO procedure has been followed, the reader can automatically transmit the read and stored LOTO information to a remote system (e.g., Master Lock Vault at https://www.masterlock-vault.com/) for further processing or longer-term storage. Such a remote system may be used for more than the storage of successful LOTO information. For example, a web-based or cloud-based remote system can receive back-up LOTO information on semi-regular intervals or on another schedule.

In some embodiments, when the reader has detected a complete LOTO procedure has been followed, the reader may prompt the user to read the location identifier again. Reading the location identifier the second time may cause the reader to write complete LOTO data to the location tag (step 320). For example, the reader may write the time of tags, the date, the users, the work order number, or other information to the location tag (and/or other tags of the LOTO system) for recall by subsequent users or readers. Upon the detected or commanded completion of the LOTO procedure, the reader may prompt the user for whether to take any final steps (e.g., e-mail a report regarding the LOTO procedure, transmit the LOTO information to remote storage via WiFi, etc.) (step 322). In some embodiments, upon completion of the LOTO process, the reader may be configured to prompt the user to take a photograph of the completed location (e.g., a picture as shown in FIG. 1B with all elements in place). The reader may transmit this picture with the text data regarding the LOTO process for storage on a remote server.

Figure 4A:
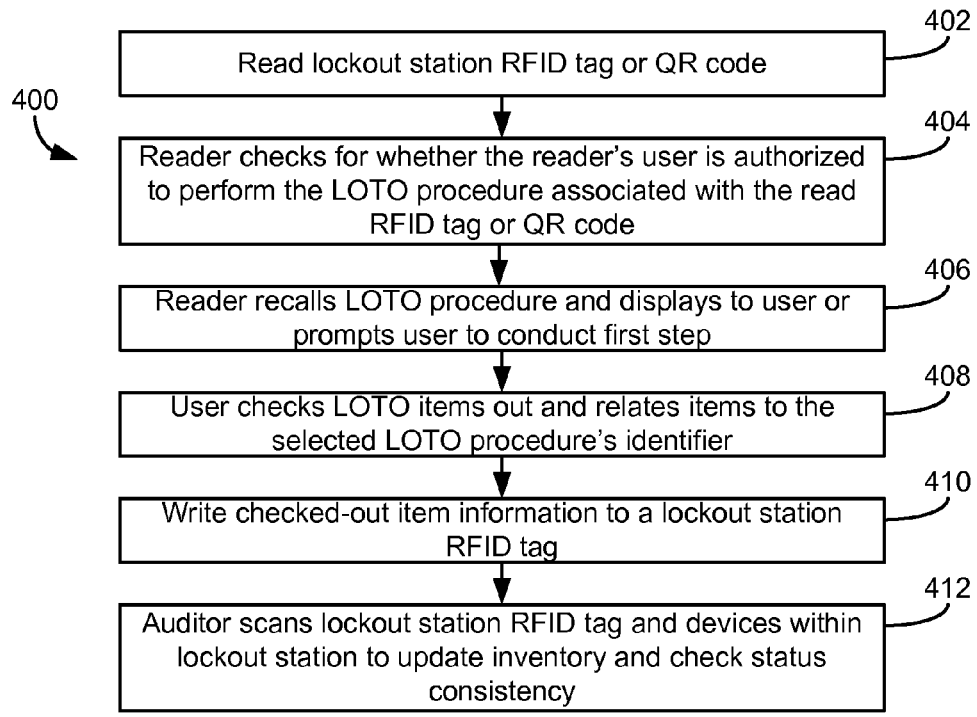
FIG. 4A is a flow chart of a process of a lockout sequence incorporating a lockout station, according to an exemplary embodiment.

Referring now to FIG. 4A, in some instances a company or other entity will have established a lockout station that stores securing items such as hasps, padlocks, and tags for use in LOTO procedures. The lockout station, according to an exemplary embodiment, may be accessed prior to and/or after the LOTO procedures of FIGS. 2 and 3 to support overall LOTO management. Process 400 of FIG. 4A is shown to include steps conducted by a reader configured with executable software to provide the steps. In an exemplary embodiment, a plurality of procedures are posted on or near the lockout station for varying LOTO procedures that can be conducted with the items/devices at the lockout station. Process 400 is shown to include reading a lockout station's RFID tag or QR code (step 402). Reading the RFID tag or QR code can include selecting one of the plurality of procedures and reading the RFID tag or QR code associated with that procedure. The reader may check for whether the reader's user is authorized to perform the LOTO procedure associated with the read RFID tag or QR code (step 404).

If the user is authorized, the reader may recall the LOTO procedure and display the LOTO procedure to the user or prompt the user to conduct the first step (step 406). In the interest of accuracy, the reader may walk the user through the LOTO procedures using a high level of granularity. For example, the reader may prompt the user to check out particular LOTO items, recognize when the correct items have been checked out, and relate items to the selected LOTO procedure's identifier once checked out (step 408). The reader may then prompt the user to hold the reader to a general lockout station RFID tag for writing the checked-out item information to the lockout station RFID tag (step 410). Periodically, therefore, an auditor can scan the lockout station's RFID tag and devices within the lockout station to update the 'inventory' of the lockout station, to check the whereabouts of devices, and to help increase information accuracy (step 412).

Process 400 may further include the reverse of the steps shown in FIG. 4A. For example, a reader may be used to check items back into the lockout station. The user may read a tag of the item to be checked-in, place the item in the lockout station, and read the location tag of the lockout station to complete the check-in process (e.g., to write/update the location station's general tag/inventory tag for the lockout station). When updates are made to the lockout station's check-in/check-out inventory, the reader may provide updated information to the remote computer (e.g., upon synchronization of the reader with a computer system, via a wireless connection, etc.).

Figure 4B:
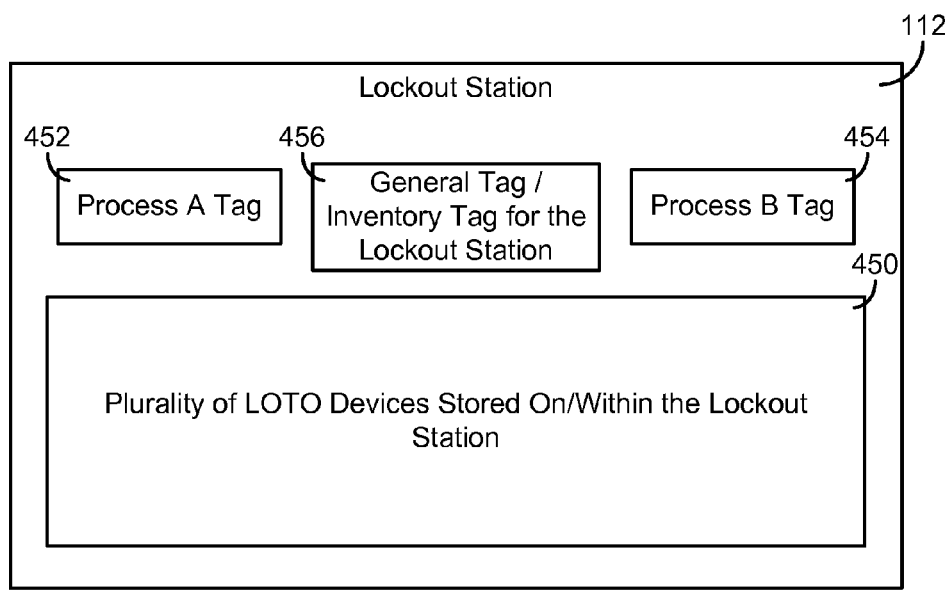
FIG. 4B is a detailed block diagram of a lockout station of the LOTO system, according to an exemplary embodiment.

Referring to FIG. 4B, a block diagram of a lockout station 112 is shown, according to an exemplary embodiment. Lockout station 112 includes an RFID tag 452 associated with a first LOTO process listing, an RFID tag 454 associated with a second LOTO process listing, and a general tag 456 (i.e., inventory tag) for lockout station 112. Lockout station 112 may contain a bin (or many hooks or crevices) for storing a plurality of LOTO devices 450 on or within lockout station 112.

Figure 5A:
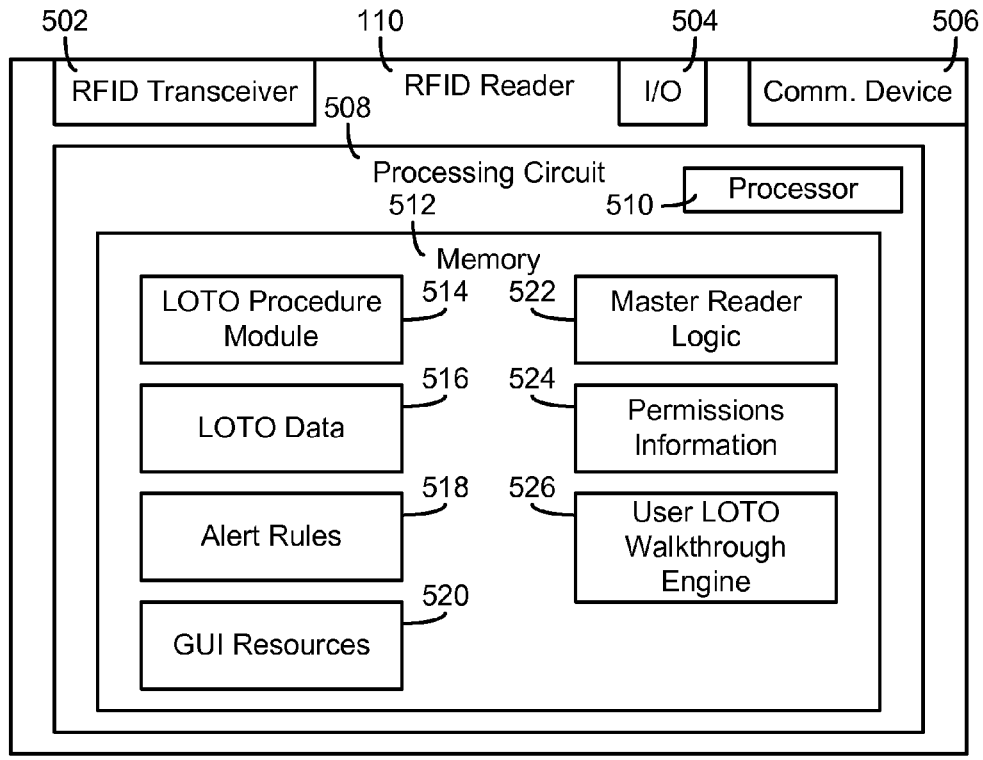
FIG. 5A is a detailed block diagram of a RFID reader of the LOTO system, according to an exemplary embodiment.

Referring to FIG. 5A, a block diagram of an RFID reader 110 is shown, according to an exemplary embodiment. RFID reader 110 is shown to include an RFID transceiver 502 (e.g., a loop antenna and a circuit configured to manage induction-based data communication using the loop antenna). RFID reader 110 is further shown to include an input-output (I/O) device 504. I/O device 504 may be a display and button set. RFID reader 110 is further shown to include a communications device 506. Communications device 506 may be a wired (e.g., a USB transceiver) or a wireless device (e.g., a WiFi transceiver, a Bluetooth transceiver). RFID reader 110 is further shown to include a processing circuit 508. Processing circuit 508 may operatively couple to RFID transceiver 502, I/O device 504, communications device 506, and any other component of RFID reader 110. Processing circuit 508 may generally be configured to operate according to the activities described in this application with reference to RFID reader 110.

Processing circuit 508 is further shown to include a processor 510 and memory 512. Processor 510 may be configured to execute computer code stored in memory 512 to configure processor 510 to complete the activities described herein.

Memory 512 is shown to include a LOTO procedure module 514. LOTO procedure module 514 may receive and store LOTO procedure steps and/or other LOTO procedure information. The LOTO procedure information may be received from an RFID tag, from a QR tag (e.g., one of the I/O devices 504 of RFID reader 110 may be an imaging sensor), or from a remote computer (e.g., via communications device 506). LOTO procedures may also be manually input into reader 110 via, e.g., a series of graphical user interfaces.

Memory 512 is further shown to include LOTO data 516. LOTO data 516 may be or include a check-in/check-out record of devices to be used in the LOTO procedure. LOTO data 516 may include dates, times, the name/description of the LOTO location, an energy type for the location, an identification of the LOTO procedure, an ordering of LOTO actions, user name logs, work order numbers, or any other read or input data regarding a LOTO procedure.

Memory 512 is further shown to include alert rules 518. Alert rules 518 may be keyed to LOTO procedure module 514. Alert rules 518 may indicate, for example, when to send an alerting e-mail or text message to managing personnel. For example, if a lock of a LOTO location is removed prematurely, an alert rule may be used to determine when to send an alert and to which contact information to send the alert.

Memory 512 is further shown to include GUI resources 520. GUI resources 520 may be scripts, graphic files, menus or other graphical user interface (GUI) components for providing a GUI to support the LOTO process. The GUI to support the process may include one or more walk-throughs or 'LOTO-Wizards' to guide a user through the LOTO processing using GUI instructions and/or feedback.

Memory 512 is further shown to include master reader logic 522 and permissions information 524. Master reader logic 522 may include a master routine for allowing a user to trigger a LOTO procedure, to conduct reading relative to the LOTO procedure, to transmit information back to a remote system, to write information to a tag on a LOTO site, or to manage other activities described in the present disclosure. Permissions information 524 may include lists of users relative to permission levels or groups, LOTO procedure to authorized user pairings, or other LOTO permissions or authentication information as described in this disclosure.

Memory 512 is further shown to include a user LOTO walkthrough engine 526. User LOTO walkthrough engine 526 may be a script or computer code module that uses information of the LOTO procedure module, GUI resources, LOTO data, and new reads of the reader at the RFID transceiver to guide a user through a LOTO process (e.g., using user I/O).

RFID tags of the present disclosure may have data permanently written to the tag at the time of manufacture or set-up, and/or may have data written to the tag when the tag is put into use.

An RFID tag may include an item field configured to store data relating to the item or items associated with the RFID tag. The item field of the RFID tag may consist of one or more bits that stores RFID tag information. If the RFID tag is associated with a location, the RFID tag may include a field for the name or description of the location, the energy type for the location, a list of approved equipment or users for the location, or other information relating to the location. As another example, if the RFID tag is associated with a user lock, a field of the RFID tag may store data relating to the user or users who have checked out the user lock, time/date information relating to when the user lock was previously locked or unlocked, etc. The data may further include a serial number, product type, part number, or any other type of identifier that identifies the user lock. RFID item data may include a product number, ID number, serial number, product type, part number, or any other information related to the LOTO item. The item data may be stored as any type of data (encrypted data, unencrypted data) in any format, and RFID reader 110, local computer 114, or remote computer 116 may be configured to interpret the data.

RFID reader 100 may be configured to read the data (e.g., the item data in the item database) from the RFID tag. RFID reader 110 may receive the item data and store the data in an item database of RFID reader 110 or transmit the data elsewhere. In one embodiment, RFID reader 110 may be a smartcard and may store the item data until the item data may be transmitted to a local or remote computer. In another embodiment, RFID reader 110 may be a mobile device and the item data may be stored in a module of the mobile device when the data is read from the RFID tag.

Figure 5B:
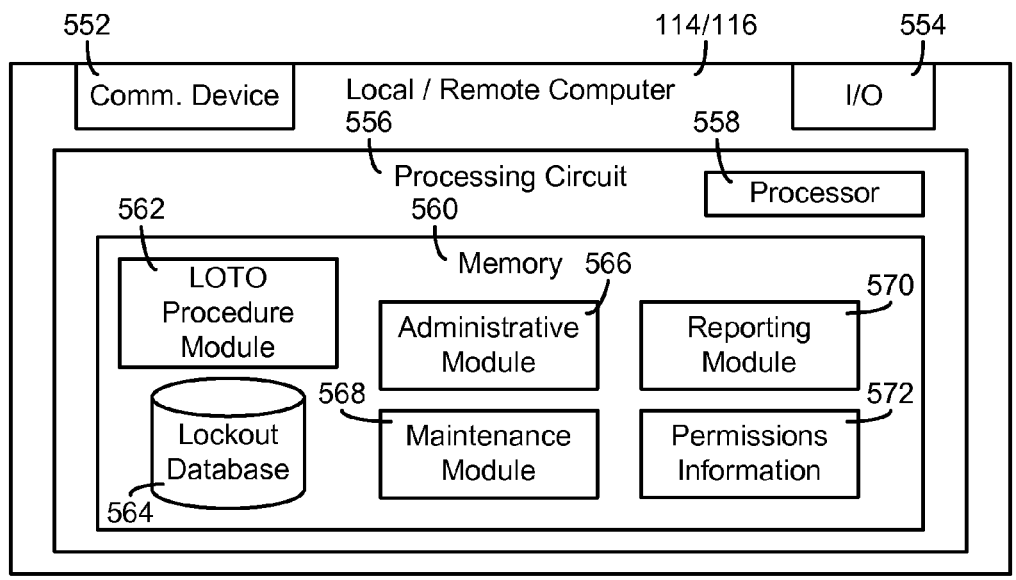
FIG. 5B is a detailed block diagram of a local or remote computer of the LOTO system, according to an exemplary embodiment.

Referring now to FIG. 5B, a block diagram of local computer 114 or remote computer 116 of FIG. 1A is shown, according to an exemplary embodiment. While FIG. 5B illustrates local computer 114 and remote computer 116 as one computing device with various modules for completing the systems and methods described herein, it should be understood that the local computer and remote computer are two separate devices as shown in FIG. 5B, and that the various modules shown in FIG. 5B may be in either or both of the local computer and remote computer. In other words, the activities of the local computer and remote computer as shown in FIG. 1A may be interchangeable.

In one embodiment, a local computer 114 is configured to receive data from RFID reader 110 and to transmit the data to a remote computer 116 for processing or analysis. Local computer 114 may be a laptop, tablet, or other mobile device, or may be a device local to the location where the LOTO system is implemented. In one embodiment, a remote computer 116 may serve as a "master" computer (e.g., a computer configured to manage all tagging and locking activities of a building or building area). The local/remote computer 114/116 includes a processing circuit 556, processor 558, memory 560, communications device 552, I/O interface 554 as described below.

Local/remote computer 114/116 includes a processing circuit 556 including a processor 558 and memory 560. Processor 558 may be implemented as a general purpose processor, an application specific integrated circuit (ASIC), one or more field programmable gate arrays (FPGAs), a group of processing components, or other suitable electronic processing components. Memory 560 may be one or more devices (e.g., RAM, ROM, solid state memory, Flash memory, hard disk storage, etc.) for storing data and/or computer code for completing and/or facilitating the various processes described herein. Memory 560 may be or include non-transient volatile memory or non-volatile memory. Memory 560 may include data base components, object code components, script components, or any other type of information structure for supporting the various activities and information structures described herein. Memory 560 may be communicably connected to processor 558 and includes computer code or instructions for executing one or more processes described herein.

Memory 560 includes various modules for completing the systems and methods described herein. Memory 560 is shown to include a LOTO procedure module 562. LOTO procedure module 562 is configured to provide LOTO procedures to a user using the lockout tagout system. LOTO procedure module 562 may include instructions to allow a user to perform a LOTO procedure. For example, a LOTO procedure may include instructions that command a user to read a location tag, equipment tag, and/or a user lock tag, to lock the user lock, and to transmit the data read by the RFID reader of the user back to local/remote computer 114/116. LOTO procedure module 562 may provide the instructions to the user via RFID reader 110 (by transmitting the instructions via I/O interface 554 to RFID reader 110).

LOTO procedure module 562 may further verify the completion of a LOTO procedure. After a user transmits data to local/remote computer 114/116 relating to a completion of a LOTO procedure, LOTO procedure module 562 may receive the data and confirm that LOTO procedures were followed. For example, LOTO procedure module 562 may confirm that all equipment and user locks that should be implemented are implemented, that all user locks are locked, etc. In one embodiment, if RFID reader 110 is a mobile device, the mobile device may send pictures or video to LOTO procedure module 562, and LOTO procedure module 562 may verify the completion of the LOTO procedure using the pictures or video.

Memory 560 further includes a lockout database 564. Lockout database 564 may store data for each location in which a LOTO system is implemented. For example, for each location, piece of equipment, or other area or object, lockout database 564 may store information relating to what pieces of equipment are to be locked out using the LOTO system, the locking mechanism being used to lock out the equipment, and the user locks locking the equipment. For example, also referring to FIG. 1B, lockout database 564 may store, for the given location and location tag 152, that the two pieces of equipment (securing items 156, 158) are locked out by the locking mechanism and the that user has locked padlocks 162. LOTO procedure module 562 may then use the data in lockout database 564 to determine a LOTO procedure, and to confirm the completion of a LOTO procedure. In one embodiment, LOTO procedure module 562 may use lockout database 564 to verify that the correct equipment, locking mechanisms, and user locks are being used, that there are no missing equipment, locking mechanisms, and user locks, etc.

Memory 560 includes an administrative module 566. Administrative module 566 allows an administrator or other user to set user permissions, LOTO procedures, and other management features. For example, the administrator may set user permissions, restricting or allowing a user to perform a LOTO procedure for a given location or equipment. The administrator may grant a user access to LOTO procedures, may allow the user the ability to read RFID tags with an RFID reader, may restrict a user from being able to read an RFID tag of a equipment, user lock, or locking mechanism, or may otherwise control the activity of a user.

Memory 560 includes a maintenance module 568. Maintenance module 568 may keep track of completed LOTO procedures. Maintenance module 568 may use the data received from an RFID reader or lockout station to determine when a location or equipment was locked out, etc.

Maintenance module 568 may further be configured to create a schedule for LOTO procedures. For example, maintenance module 568, for a given location or equipment, may determine a schedule to be followed by one or more users. The users may then perform LOTO procedures for the location or equipment based on the schedule, and may transmit the data to local/remote computer 114/116 upon completion. Maintenance module 568 may then verify that the LOTO procedures were followed and adhered to the schedule.

Memory 560 includes a reporting module 570. Reporting module 570 is configured to receive information relating to LOTO procedure activity and to generate a report relating to the activity. For example, a report listing all LOTO procedures performed in a given time from or in a given location may be generated by reporting module 570. As another example, a report listing all equipment, user locks, or locking mechanisms in use may be generated.

Memory 560 includes permissions information 572. Permissions information 572 can include lists of users relative to permission levels or groups, LOTO procedure to authorized user pairings, or other LOTO permissions or authentication information as described in the disclosure.

Local/remote computer 114/116 further includes an I/O interface 554. I/O interface 554 may configured to communicate with RFID reader 110, either via a wired connection or wirelessly. Local/remote computer 114/116 further includes a communications device 552. In one embodiment, I/O interface 554 and/or communications device 552 may include capabilities for receiving data from a smart card, fob, or other RFID tag. In another embodiment, I/O interface 554 and/or communications device 552 may be configured to receive data wirelessly from a mobile device.

It should be understood that the modules of FIG. 5B may not be exclusive to a local or remote computer. The activities of the local computer of may be performed by the remote computer, and vice versa. For example, the local computer may include an administrative module or maintenance module, allowing a user to control management of the tagging and locking system. As another example, either the remote computer or local computer may use data from the RFID reader to verify that LOTO procedures were followed.

Figure 6:
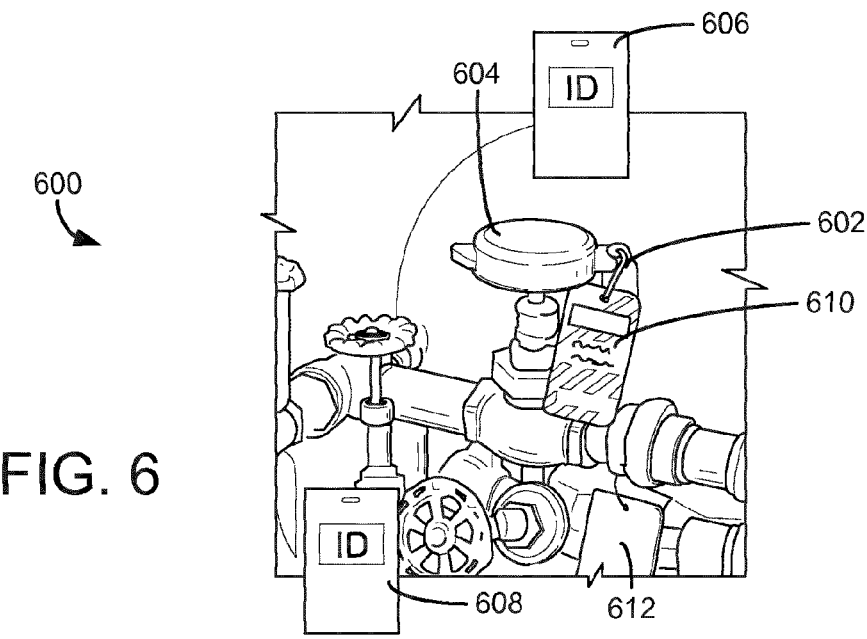
FIG. 6 is another example environment in which the LOTO system of the present disclosure may be implemented, according to an exemplary embodiment.

Systems and Methods for Using Wireless Communication to Support Electrical Locks of a Lockout Tagout System Referring generally to FIGS. 6-9B, systems and methods for using wireless communication to support electrical locks of a LOTO system are shown and described. In FIG. 6, the equipment (e.g., a gas valve) in LOTO system 600 is shown as being locked out by securing item 604 and user padlock 602 (which locks securing item 604 in place). User padlock 602 may be an electronic safety lock (e.g., as described in International Application No. PCT/US11/59935). Relative to the previous Figures, user padlock 602 electronically records the actual lock and unlock times. Because the lock and unlock times for padlock 602 of LOTO system 600 are tracked by the padlocks themselves, LOTO procedure data gathering or auditing may be expected to have higher accuracy.

According to some exemplary embodiments, user ID 606 can be used to replace mechanical keys for unlocking user padlock 602. For example, a commercially available 13.56 Mhz ID card or tag manufactured by HID Global could be used as the key, a 125 KHz ID card could be used as the key, or another card at another frequency could be used as the key.

In the embodiment of FIG. 6, user padlock 602 itself may be configured to function as an RFID read/write device (e.g., user padlock 602 includes an RFID read/write device) so that the location, devices, and other LOTO devices as described herein could be read into user padlock 602. Padlock 602 may then write data to another smart card or user ID 608 for transfer on to other devices or for carrying to a stationary reader.

In an exemplary embodiment, a LOTO system may have a mix of electronic locks and mechanical only locks. For example, the last padlock locked at a LOTO location as part of a LOTO procedure and the last padlock removed from the LOTO location as part of a LOTO procedure may be an electronic lock having the capability to electronically log and track information.

An electronic lock may be configured to prevent removal until the electronic lock has read that a correct procedure has been followed. For example, when a user acts on the electronic lock as part of a LOTO procedure, the electronic lock may read the user action and determine if a correct procedure was followed by the user. If the procedure was incorrect (e.g., the user was not approved to handle the lock, the procedure was not done at a specific time, etc.), the electronic lock may not allow a user to remove the lock by unlocking the lock.

An electronic lock may be configured for removal only by certain users. When a proper user ID is read by the lock, only then will the lock disengage. The lock may be configured not to disengage during certain hours of the day, regardless of whether the user is proper or improper.

An electronic lock may be configured to require reads by multiple users before disengaging. For example, a lock may be configured so that a site manager and a chief technician both must scan the lock within a one minute period of time for the lock to disengage. Such a lock may continue to have a slot for a mechanical key, for example where special procedures might be in-place to allow unlocking via the mechanical key.

The electronic lock may include processing circuitry including memory. The electronic lock may use the memory to record or include a list of users allowed to unlock the lock. The memory may further be used to record or include a list of proper equipment for use with the LOTO site. The memory may further be used to record or include a list of a proper ordering for a LOTO procedure (e.g., lockout, removal).

The memory may further be used to record and indicate the user who placed the lock or last unlocked the lock. Such information may be read out of the lock by a reader.

The lock may also write information to the user's ID tag 606 the fact that ID tag 606 was used to lock out a site, the name of the site, and when. The user may be required to have their card read before reading an area. Moreover, if ID tag 606 already indicates that a user has locked out or removed lockout from a single site in a day, the second lock may be configured to prevent the user from unlocking another lock or removing lockout from a second site in a day. Varying parameters may be established depending on the LOTO procedures of the particular company making use of system 600.

System 600 may record the exact time that the lock was added or removed. The lock (or devices having read the lock) may know whether the lock was removed at a proper point in time (e.g., between audits). An auditing process, therefore, may be shorter as the reader could simply read padlock 602 to determine whether the locked-out state of system 600 has changed. In some embodiments, user padlock 602 can be used to replace another reader. For example, user padlock 602's reading circuitry can read lockout tag 610, an RFID tag of securing item 604, location tag 612, and/or user IDs 606, 608. In embodiments where user padlock 602 can write to RFID tags, user padlock 602 may transfer data regarding the LOTO procedure or audit data to a low cost smart card (e.g., user ID 608) for transferring data regarding the LOTO site back to another system (e.g., a local computer).

In an exemplary embodiment, a lock for a LOTO procedure includes a LOTO process (e.g., lockout, clearance for work) may include multiple steps. A user responsible for each step may scan his or her ID card using reading circuitry of the lock. The lock may engage or disengage (i.e., locks, unlocks) depending on whether appropriate personnel have scanned the lock in an appropriate order and/or according to an appropriate schedule. Such a system may eliminate the need for multi-user hasps and reduce the complexity of a LOTO site. A local computer may be used to write the proper permissions and processes to the lock. In some embodiments, a smart phone or reader may operate in conjunction with the electronic lock to walk the user through the LOTO process and to verify/audit steps.

Figure 7:
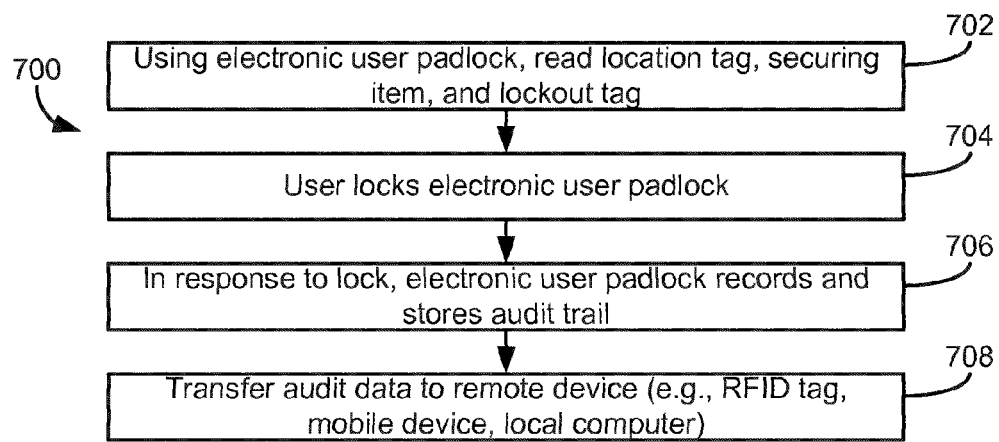
FIG. 7 is a flow chart of a LOTO process of the LOTO system of FIG. 6, according to an exemplary embodiment.

Referring now to FIG. 7, a flow chart of a LOTO process 700 is shown, according to an exemplary embodiment. LOTO process 700 may be used, for example, in system 600 of FIG. 6. Process 700 is shown to include using an electronic user padlock (e.g., padlock 602) to read LOTO equipment (e.g., securing item 604, lockout tag 610, location tag 612 of FIG. 6) (step 702). The user conducting this reading may use his or her ID (e.g., ID 606) to cause the electronic user padlock to associate the LOTO reads with the user. When the user locks the electronic user padlock (step 704), in response to the lock, the lock may record and store the data read from the various LOTO items as an audit trail (step 706). The audit trail may include particular dates and times of each read. Using a reader (e.g., smartphone, RFID reader, etc.), the audit trail stored on the electronic user padlock may be read and transferred to a remote device (step 708). As mentioned above, a second user ID (e.g., ID 608) may be used to record the audit trail if the electronic user padlock is configured for RFID writing capabilities. The memory of the electronic user padlock may be used in conjunction with an RFID writer to change the authorized users, and set the authorized users that may remove the LOTO system to provide a clearance to work state.

Logic programmed into the electronic circuitry of the electronic user padlock could be used to help ensure security and accuracy with respect to the LOTO process. Logic of the electronic lock may be configured to check for whether the lock is allowed to lock out the given location (e.g., in response to scanning the location tag). If the lock is not allowed to lock out the given location, the electronic circuitry of the lock may cause negative feedback to be communicated (e.g., via a buzzer, via a red LED). If the lock is not allowed to lock out the given location, the lock may refrain from engaging or locking until authorizations are proper. Logic of the electronic lock may be used to determine whether the user (e.g., once the electronic user padlock scans the user ID) is allowed to lock out the LOTO location (e.g., as identified using the location tag). Logic of the electronic lock may be configured to check for whether the devices required for a LOTO process at the identified location have been used. If the devices required for valid lockout have not been used, then the electronic lock may provide a warning (the warning could be a simple buzz that signals a user should restart the process). In other embodiments, the warning may include an identification of the device missing from the process. For example, a circuit of the electronic lock may write to an "incorrect/missing device" field in memory. A reader may then read this field and display the incorrect/missing device on a display associated with the reader.

Figure 8:
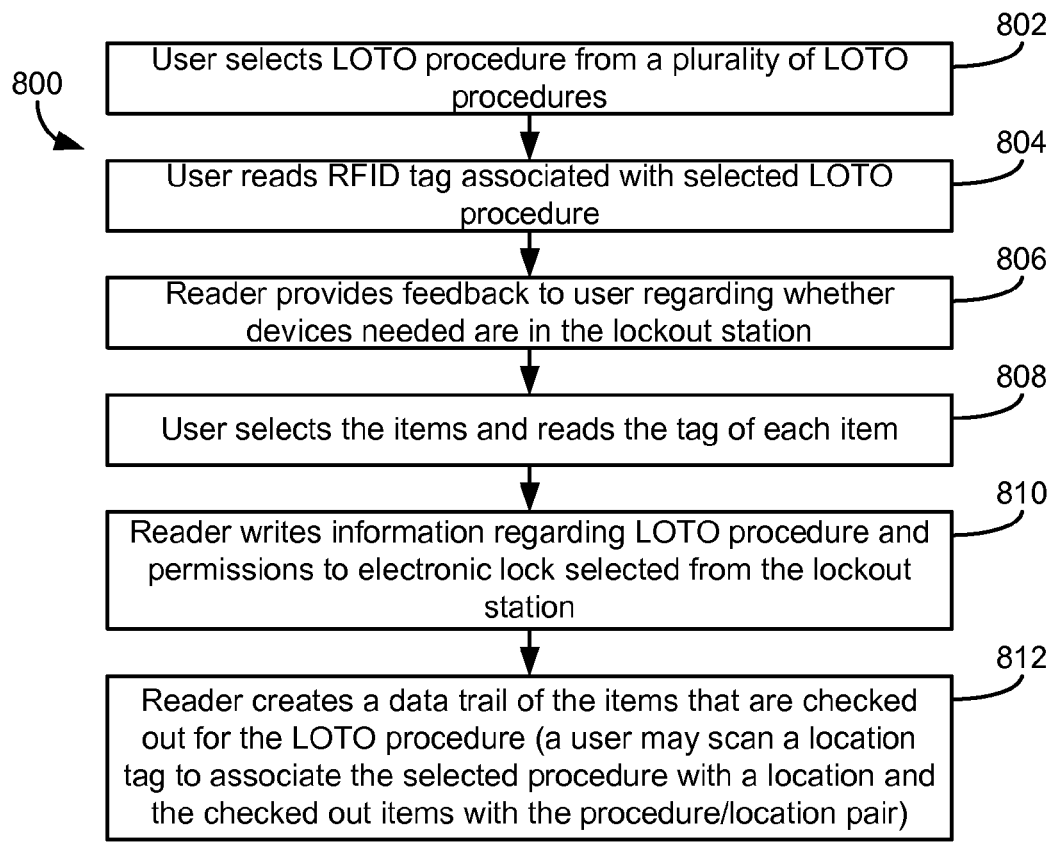
FIG. 8 is another flow chart of a LOTO process, according to an exemplary embodiment.

Referring now to FIG. 8, a flow chart of a LOTO process 800 is shown, according to another exemplary embodiment. Process 800 includes a user selection of a LOTO procedure from a plurality of LOTO procedures (step 802). The procedures may be listed on a sheet or posted on boards near a lockout station. The user may read an RFID tag associated with the selected LOTO procedure (step 804). The reader may then provide feedback to the user regarding whether the devices needed for the LOTO procedure are in the lockout station (step 806). The user may then select the items (e.g., take the items out of the lockout station) and read the tag of each selected item (step 808). The reader may provide user feedback regarding whether the selected and read items are proper or not. The reader may write information regarding the LOTO procedure to the electronic lock selected from the lockout station (step 810). The electronic lock may then use the written information to proceed according to, e.g., process 700 of FIG. 7. The data written to the electronic lock may include information such as the approved users, the previously selected/read items, and clear the audit trail stored inside the electronic lock. The reader may create an audit trail of the items that are checked out for the LOTO procedure (step 812). For example, a user may scan a location tag to associate the selected procedure with a location and the checked out items with the procedure/location pair.

After completing the LOTO procedure using the items selected by the user, the user could write information to an ID card. The ID card may then be read by the reader at the lockout station to transfer the LOTO details (e.g., time and confirmation data of the LOTO process) to the reader/lockout station and/or computer associated therewith. A reader at the lockout station may be used to check items back into the lockout station.

Wireless Electronic Locking Systems and Methods for Lockout-Tagout

Figure 9A:
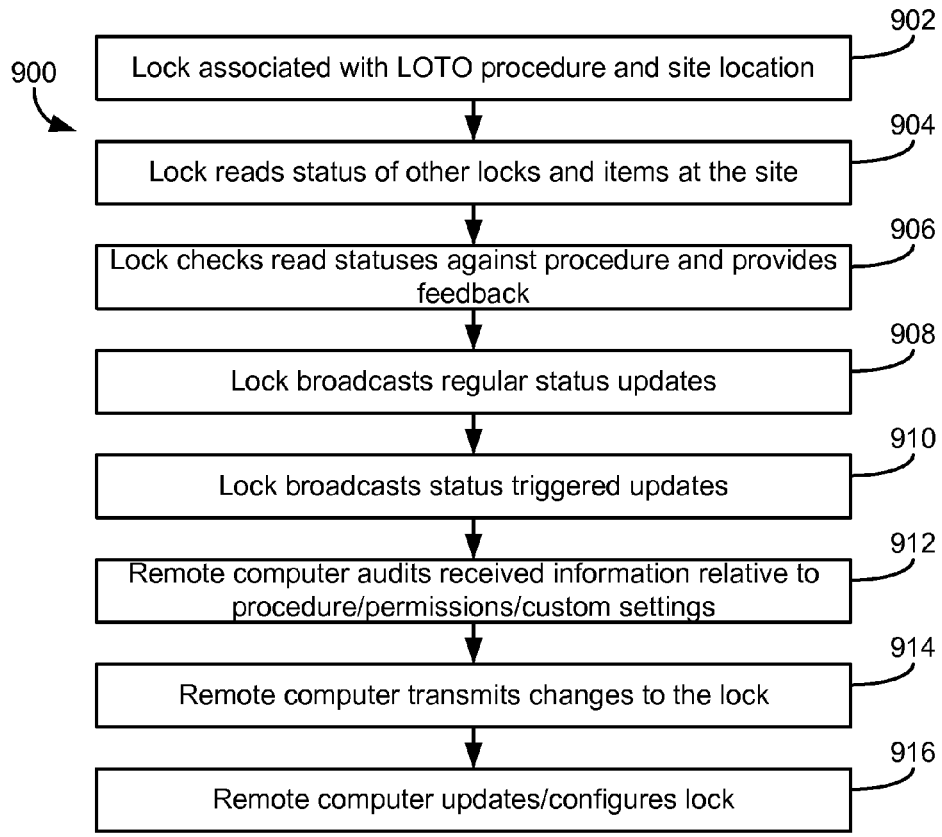
FIG. 9A is a flow chart of a process of associating a wireless communications lock with a LOTO procedure and a site location, according to an exemplary embodiment.
Figure 9B:
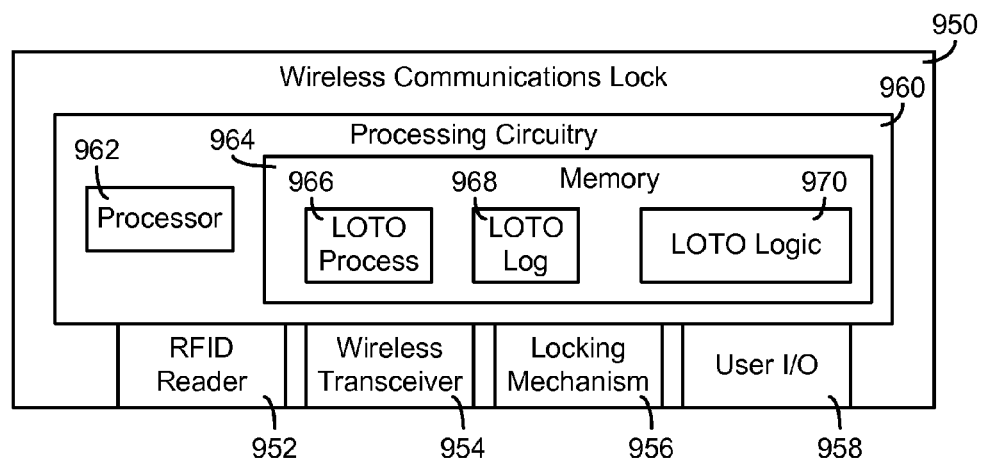
FIG. 9B is a block diagram of a wireless communications lock, according to an exemplary embodiment.

Referring now to FIGS. 9A-B, a LOTO system and method are described wherein the user lock is configured for longer-range wireless communication (e.g., WiFi rather than inductive RFID) with other devices such as a computer or network. Using the wireless communication, the user lock communicates with a local or remote computer (e.g., the local or remote computer of FIG. 1A), providing real-time (or near real-time) status of the lock.

Process 900 of FIG. 9A illustrates the step of associating the wireless communications lock with a LOTO procedure and with the site location (step 902). Such association may occur by transferring data to the wireless communications lock using a wireless transceiver of the wireless communications lock. The association may be managed by a computer system that wirelessly communicates settings to the wireless communications lock.

As the user completes a LOTO procedure, the user may use an RFID reader or other wireless communications of the lock to read the status of other locks and items at the site (step 904).

The lock may recall the LOTO process from memory and check the read statuses against the recalled LOTO process (step 906). The lock may provide user feedback via a user I/O device coupled to the lock (e.g., a display, an LED, a speaker, etc.).

The lock may use wireless communications to broadcast regularly timed status updates to the remote computer (step 908). Such regular broadcasts may be used by the computer system to confirm that the lock has not been removed from the LOTO area or unlocked without proper authorization/procedure.

The lock may also or alternatively use status triggered updates to send information to the remote computer for consumption (step 910). The status triggered updated may be sent, for example, in response to an unlock/lock state change. Other events may be programmed into the wireless communications lock to trigger status/information transmissions. For example, if an unauthorized user attempts to remove the lock, the lock may send an alert describing the unauthorized access attempt.

The removal of LOTO items in an incorrect order or at an unexpected time may cause the wireless communications lock or a remote computer receiving information from the lock to send an alert to users via text message or e-mail.

The remote computer may receive the communications from the wirelessly communicating lock (step 912). The remote computer may audit the received information relative to stored procedures, permissions, or custom settings stored in or accessible to the remote computer.

A user removing himself or herself from a lock (e.g., a user indicating that his or her task is complete, a user removing himself/herself from being able to operate the lock, from being part of a LOTO procedure that includes the lock, etc.) may notify another user that a task is complete.

Complete removal of the lock could indicate that a test of the potentially dangerous equipment is imminent or that the equipment is coming back online.

The remote computer may transmit changes to the lock (step 914) For example, the lock may be remotely unlocked in response to a command received from the remote computer.

The lock may be remotely configured and updated in response to commands and information received from the remote computer (step 916).

The removal of the lock, a user, or a LOTO item in the incorrect order or at an unexpected time may cause alerts to be sent.

The lock may enforce the correct site procedure in terms of sequence or timing by receiving the status of other locks or LOTO items at the site.

Audits and provisioning may be completed in real time and remotely using the wireless communications lock.

FIG. 9B is a block diagram of a wireless communications lock 950. Lock 950 includes an RFID reader 952 (e.g., for reading user IDs, for reading other LOTO items). Lock 950 is further shown to include a wireless transceiver 954 (e.g., for conducting longer range wireless communications with a remote device such as a remote computer). Wireless transceiver 954 can be a WiFi transceiver, a Bluetooth transceiver, or another type of longer range wireless transceiver (e.g., longer range than near touching induction communication). The locking mechanism 956 of lock 950 may be controlled and/or provide information to the processing circuitry. A user I/O 958 (e.g., an LED, a buzzer, a speaker, a display, etc.) may be controlled by the processing circuitry. One or more buttons or switches may be provided on the lock (e.g., to trigger proceeding with a process, to clear a memory, to test a battery, etc.). The processing circuitry 960 of lock 950 is shown to include a processor 962 and memory 964. Memory 964 is shown to include a LOTO process 966. LOTO process 966 may be stored as a list of steps to be completed for the LOTO process to be valid. Memory 964 further includes a LOTO log 968. LOTO log 968 may be a log as captured (i.e., read, sensed, received) by the lock and be a record of what has actually occurred during a LOTO event. Memory 964 further includes LOTO logic 970. LOTO logic 970 may operate wireless communications lock 950 in concert with LOTO process 966 and LOTO log 968. For example, LOTO logic 970 may facilitate the lock 950's operations in process 900 of FIG. 9A.

According to varying embodiments and/or the Figures generally, the RFID tags described herein could operate at 13.56 MHz (HF) or 125 KHz. The RFID tags may be compatible with NFC devices and/or HID smart cards. The RFID tags may be compatible with other RFID padlocks. The RFID tags may be compatible with the 868-928 MHz (UHF) frequency range that is common for longer range inventory tracking/management use (at sites such 'inventory' may be used for LOTO tracking purposes).

The RFID tags of the present disclosure may be configured to store any amount of data, e.g., from 48 bits to 8000 bits. For example, with reference to FIGS. 1A-B, the RFID tags of the user padlocks may store limited data, while a location tag may store more data. The RFID tags may have various standards for storing the data on the tag, and the local or remote computer may be configured to interpret the data on the tag. For example, a tag may be configured such that the first 6 bits stored relate to a serial number of a user padlock the tag is associated with, the next 6 bits relate to the type of tag, the next 5 bits relate to a product number, and so forth. The local or remote computer may then be configured to interpret the data upon receiving the data. For example, a one or two bit number may be stored on the RFID tag that is representative of an approved user of the user padlock the RFID tag is associated with, and the remote computer is configured to receive the number and retrieve the appropriate user information.

While many of the above examples specifically mentioned RFID technology, other short or long range wireless technologies may be used and still fall within the scope of this disclosure. In some embodiments, for example, reading QR codes may be considered wireless communications and such reads may be conducted to receive information from e.g., LOTO items. QR codes, as described above, can be used in conjunction with RFID tags for different or similar purposes. For example, a QR code may communicate a LOTO process to a smart phone or reader while a set of RFID tags may be read to check LOTO items in/out of a process or site.

In an exemplary embodiment, a hasp having a built-in or affixed RFID tag is provided. The RFID tag may be read from and written to in order to check steps off of a LOTO process. In other embodiments, the hasp may include longer range wireless communications circuitry such as described with reference to FIGS. 9A and 9B.

In some embodiments, the RFID antennas could be configured so that they are disconnected if the lock is open or closed. Such a configuration may prevent a lock from being present, but not in the intended state.

The systems and methods of the present disclosure are described in many locations with reference to RFID technology. According to varying embodiments of the disclosure, however, the systems and methods of the present disclosure may be implemented with any wireless technology that allows information to be wirelessly transferred between user devices, lockout devices, and equipment. For example, in some embodiments, near field communication (NFC) technology, QR technology, Bluetooth technology, or any other type of wireless technology may be used.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. An electronic lock, comprising:
a locking mechanism configured to facilitate locking at least one of a location or a device;
a wireless transceiver configured to (i) wirelessly communicate with wireless identification devices of lockout-tagout devices associated with the at least one of the location or the device and (ii) wirelessly communicate with an external device;
a memory configured to store a list of steps to be completed for a lockout-tagout procedure; and
a processor configured to:
recall the list of steps for the lockout-tagout procedure from the memory;
read the wireless identification devices of the lockout-tagout devices at the at least one of the location or the device to gather lockout-tagout procedure data, wherein gathering the lockout-tagout procedure data includes identifying the lockout-tagout devices and monitoring the lockout-tagout devices to facilitate determining whether the list of steps for the desired lockout-tagout procedure are complied with; and
transmit the lockout-tagout procedure data to the external device.

2. The electronic lock of claim 1, wherein the wireless transceiver includes an RFID writer configured to write the lockout-tagout procedure data to a smart card, wherein the smart card is configured to facilitate transferring the lockout-tagout procedure data to the external device.

3. The electronic lock of claim 1, wherein the wireless transceiver facilitates near range wireless communication with the external device, wherein the external device includes a portable electronic device configured to facilitate transferring the lockout-tagout procedure data to a remote server.

4. The electronic lock of claim 1, wherein the wireless transceiver facilitates long range wireless communication with the external device, the external device including at least one of a network access point or a remote server.

5. The electronic lock of claim 1, wherein the wireless transceiver includes a first transceiver configured to wirelessly communicate with the wireless identification devices via a first protocol and a second transceiver configured to wirelessly communicate with the external device via a second protocol.

6. The electronic lock of claim 1, wherein the processor is further configured to prevent the locking mechanism from at least one of locking or unlocking in response to a determination that the list of steps for the lockout-tagout procedure have not been complied with.

7. The electronic lock of claim 1, wherein the external device is configured to determine whether the list of steps for the lockout-tagout procedure are complied with.

8. The electronic lock of claim 1, wherein the processor of the electronic lock is further configured to determine whether the list of steps for the lockout-tagout procedure are complied with.

9. The electronic lock of claim 1, wherein the memory is further configured to store a list of approved users of the electronic lock, wherein the processor is further configured to receive a user identification of a user of the electronic lock, and wherein the processor is configured to prevent the locking mechanism from at least one of locking or unlocking in response to determining that the user is not an approved user of the electronic lock based on the user identification and the list of approved users.

10. A method, comprising:
storing, by a memory of an electronic lock, a list of steps for a lockout-tagout procedure associated with at least one of a location or a device;
reading, by a communications device of the electronic lock, wireless identification devices of lockout-tagout devices positioned at the at least one of the location or the device to gather lockout-tagout procedure data, wherein gathering the lockout-tagout procedure data includes:
identifying, by a processing circuit of the electronic lock, the lockout-tagout devices; and
monitoring, by the processing circuit, the lockout-tagout devices to facilitate determining whether the list of steps for the lockout-tagout procedure are complied with; and
transmitting, by the communications device, the lockout-tagout procedure data to the external device.

11. The method of claim 10, further comprising preventing, by the processing circuit, a locking mechanism of the electronic lock from at least one of locking or unlocking in response to a determination that the list of steps for the lockout-tagout procedure have not been complied with, wherein at least one of the processing circuit or the external device is configured to make the determination that the list of steps for the lockout-tagout procedure have not been complied with.

12. The method of claim 10, further comprising:
storing, by the memory, a list of approved users of the electronic lock;

receiving, by the communications device, a user identification of a user; and preventing, by the processing circuit, a locking mechanism of the electronic lock from at least one of locking or unlocking in response to determining that the user is not an approved user of the electronic lock based on the user identification and the list of approved users.

13. The method of claim 10, further comprising receiving, by the external device, the lockout-tagout procedure data from the electronic lock, wherein the external device includes at least one of a portable electronic device, a network access point, or a remote server.

14. The method of claim 13, further comprising determining, by the external device, whether the list of steps for the lockout-tagout procedure are complied with.

15. The method of claim 13, further comprising aggregating and auditing, by the external device, the lockout-tagout procedure data from a plurality of electronic locks.

16. An electronic locking system, comprising:
an electronic lock including:
a locking mechanism configured to facilitate locking at least one of a location or a device;
a communications device configured to (i) facilitate reading wireless identification devices of lockout-tagout devices associated with the at least one of the location or the device and (ii) facilitate wireless communication with a portable electronic device; and a processing circuit configured to read the wireless identification devices of the lockout-tagout devices at the at least one of the location or the device to gather lockout-tagout procedure data, wherein compliance with a lockout-tagout procedure associated with the at least one of the location or the device is determinable by comparing the gathered lockout-tagout procedure data with a list of steps for the lockout-tagout procedure.

17. The electronic locking system of claim 16, wherein the communications device utilizes at least one of a Bluetooth communication protocol, an inductive RFID communication protocol, a quick response code communication protocol, or a near field communication protocol.

18. The electronic locking system of claim 16, further comprising the portable electronic device, wherein the processing circuit is further configured to transmit the lockout-tagout procedure data to the portable electronic device.

19. The electronic locking system of claim 18, wherein the portable electronic device is configured to provide the lockout-tagout procedure data received from the electronic lock to a remote server, wherein the remote server is configured to determine whether the list of steps for the lockout-tagout procedure are complied with.

20. The electronic locking system of claim 16, wherein the processing circuit is further configured to determine whether the list of steps for the lockout-tagout procedure are complied with.

* * * * *